United States Patent [19]

Gardiner et al.

[11] 4,137,185

[45] Jan. 30, 1979

[54] STABILIZED IMIDE GRAFT OF ETHYLENE COPOLYMERIC ADDITIVES FOR LUBRICANTS

[75] Inventors: John B. Gardiner, Mountainside; James Zielinski, Somerset; Robert L. Elliott, Scotch Plains; Stanley J. Brois, Westfield, all of N.J.

[73] Assignee: Exxon Research & Engineering Co., Florham Park, N.J.

[21] Appl. No.: 819,846

[22] Filed: Jul. 28, 1977

[51] Int. Cl.$^2$ .................. C10M 1/40; C10M 3/34; C10M 1/32; C10M 3/26
[52] U.S. Cl. ........................ 252/33; 252/51.5 A; 252/402; 252/403
[58] Field of Search .............. 252/51.5 A, 33, 402, 252/403

[56] References Cited

U.S. PATENT DOCUMENTS

| | | | |
|---|---|---|---|
| 3,216,936 | 11/1965 | Le Suer | 252/32.7 |
| 3,326,804 | 6/1967 | Roselle | 252/51.5 A |
| 3,415,750 | 12/1968 | Anzenberger | 252/51.5 A |
| 4,051,050 | 9/1977 | Elliott et al. | 252/51.5 A |

FOREIGN PATENT DOCUMENTS 843360 12/1976 Belgium .................. 252/51.5 A 1018982 2/1966 United Kingdom .............. 252/51.5 A

*Primary Examiner*—Irving Vaughn
*Attorney, Agent, or Firm*—Roland A. Dexter; Frank T. Johmann

[57] ABSTRACT

Oil-soluble, derivatized ethylene copolymers derived from about 2 to 98 wt. % ethylene, and one or more $C_3$ to $C_{28}$ alpha-olefins, e.g. propylene, which are grafted, preferably solution-grafted under an inert atmosphere and at elevated temperatures and in the presence of a high-temperature decomposable free-radical initiator, with an ethylenically-unsaturated dicarboxylic acid material and thereafter reacted with a polyamine having at least two primary amine groups, e.g. an alkylene polyamine such as diethylene triamine, to form carboxyl-grafted polymeric imide, usually maleimide, derivatives are reacted with an anhydride of a $C_1$-$C_{30}$ hydrocarbyl substituted acid, preferably acetic anhydride, to yield an oil-soluble stable amide of said polyamine whereby oil solutions of said amide derivative are characterized by minimal viscosity change over an extended period of time. Useful number average molecular weight ($\bar{M}_n$) of said copolymers range from about 700 to 500,000; however, if the molecular weight is from 10,000 to 500,000 then these copolymers are also useful as multifunctional viscosity index improvers.

10 Claims, No Drawings

STABILIZED IMIDE GRAFT OF ETHYLENE COPOLYMERIC ADDITIVES FOR LUBRICANTS

BACKGROUND OF THE INVENTION

1. FIELD OF THE INVENTION

This invention relates to stable polymeric dispersant additives for lubricating oils which may also be useful as viscosity-index improvers for lubricating oils. More particularly, this invention relates to viscosity stable solutions of substantially saturated polymers comprising ethylene and one or more $C_3$ to $C_{28}$ alpha-olefins, preferably propylene, which have been grafted in the presence of a free radical initiator with an ethylenically-unsaturated dicarboxylic acid material preferably at an elevated temperature and in an inert atmosphere, and thereafter reacted first with a polyamine, preferably an alkylene polyamine, having at least two primary amino groups, such as diethylene triamine, and then with an anhydride of an organic acid, to form multifunctional polymeric reaction products characterized by viscosity stabilizing activity in mineral oil solutions.

2. DESCRIPTION OF THE PRIOR ART

Ashless dispersants or detergents for lubricating oil compositions are well known to enhance the sludge dispersing ability of said compositions.

One type of dispersant is generally derived from a hydrocarbon substituted dicarboxylic acid material such as an alkenyl succinic acid or anhydride reacted with a nitrogen-containing material. United Kingdom Patent Specification No. 1,018,982 teaches of reacting said alkenyl succinic anhydride with a 2-imidazoline or pyrimidine (the latter is obtained from the reaction of a carboxylic acid, e.g. acetic acid and an alkylene polyamine, e.g. diethylene triamine) to provide a sludge dispersant for lubricating oils. Similarly, U.S. Pat. No. 3,415,750 teaches of polyalkenyl succinicimido imidazolines and bis-imidazolines which can be used as said ashless detergents. The imidazoline is first prepared by the reaction of a polyethylene polyamine with a carboxylic acid or its anhydride, e.g. acetic which product is thereafter reacted with a polyalkenyl succinic anhydride.

In contrast to the above, U.S. Pat. No. 3,216,936 teaches that it is advantageous to insure that the reaction product of a mixture of a hydrocarbon-substituted succinic acid, a monocarboxylic acid and an alkylene polyamine does not come from an intermediate reaction product of said monocarboxylic acid and said amine in order to avoid destroying the sludge dispersant activity of the final reaction product.

It is well known that the introduction of carboxylic acid groups onto ethylene copolymers provides a means for derivatizing said copolymers which have viscosity index (V.I.) improving activity when dissolved in mineral oils. One means of introducing the carboxylic groups is by grafting of maleic anhydride onto said polymer as by a free radical mechanism.

Belgian Pat. No. 843,360 teaches the production of soluble, sludge-dispersing additives for hydrocarbon fuels and lubricating oils by the free-radical induced grafting in solution of an ethylenically-unsaturated dicarboxylic acid material such as maleic anhydride onto a substantially saturated copolymer comprising ethylene and at least one other alpha-olefin at an elevated temperature to provide, without substantial polymer degradation, a useful precursor copolymer which can be subsequently reacted with a carboxylic acid reacting polyfunctional material, such as a polyamine or a hydroxyamine or mixtures of these, to form multifunctional polymeric imidated derivatives having particular utility as engine sludge and varnish control additives for lubricating oils.

It is often found that during the storage of oil solutions of these various imidated grafted hydrocarbon polymers that the viscosity of the solution is increased. The source of this increase appears to be at least in part the chain extension of the polymer.

It is an object of this invention to provide a grafted ethylene copolymeric dispersant, generally useful as a mineral oil viscosity index improver of useful sludge performance and enhanced viscosity stabilizing activity.

SUMMARY OF THE INVENTION

It has been discovered that the reaction of the imidated products/byproducts of the graft reaction with organic acid anhydrides, e.g. acetic anhydride, has been found to provide amide derivatization of any primary amino groups of the imidated ethylene copolymer whereby viscosity stabilizing activity is provided to said copolymers.

The subject matter of this invention is exemplified in a composition comprising a lubricating oil having dissolved therein at least a viscosity index improving amount, generally ranging from about 0.1 to about 50 wt. %, based on the total weight of said composition, of an oilsoluble $C_1$ to $C_{30}$ hydrocarbyl amide of an imide, preferably an alkylene polyamido-imide, grafted ethylene polymeric viscosity index improver containing from about 0.001 to 8, preferably 0.1 to 2, wt. % of nitrogen.

The process of the invention can be considered a process for improving the viscosity stabilization of an oil additive concentrate comprising a hydrocarbon solvent, from 0.1 to 50 wt. % based on the total weight of said concentrate of an imidated grafted ethylene $C_3$-$C_{28}$ $\alpha$-olefin copolymeric viscosity index improver having a molecular weight ($\overline{M}_n$) of 700 to 500,000 and a $\overline{M}_w/\overline{M}_n$ ratio of less than 7 comprising the step of reacting said concentrate with a hydrocarbyl substituted acid anhydride wherein the hydrocarbyl constituent has from about 1 to 30, preferably 1 to 18 carbons by adding said acid anhydride in about 0.5-2.5, preferably 1-1.5, moles per primary amino group of said concentrate and maintaining said concentrate at a temperature ranging from about 50° to about 250° C., preferably 100° to about 200° C., and for a period of 0.25 to 8, preferably 0.5 to 3 hours.

It is believed that the viscosity stabilization involves conversion of the primary amino groups of the imide reaction product to an amide preventing chain extension of the derivatized ethylene copolymeric multifunctional V.I. improver.

The reaction appears to be an acylation of pendant primary amine groups by their reaction with the organic acid anhydride which can be represented as follows:

ethylene copolymer chain

-continued

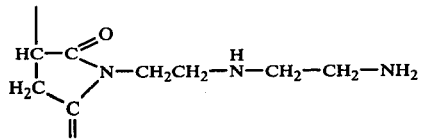

alkylene amino-imide of a grafted ethylene copolymer

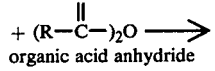

organic acid anhydride

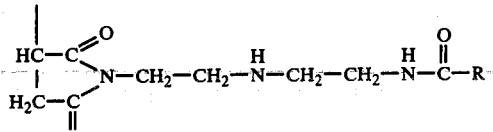

hydrocarbyl amide of an alkylene imide grafted ethylene copolymer

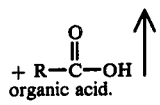

organic acid.

This acylation of the free primary amino group with the anhydride produces an amide structure which limits the multifunctionalized copolymers property of solution chain extension thereby inhibiting viscosity increase of oil solutions containing the class of additives of the invention.

To enhance the freedom from haze of the mineral oil solutions, the mineral oil compositions of the invention can be further reacted with an oil-soluble hydrocarbyl substituted acid having from about 10 to 70 carbon atoms having a pK of less than about 2.5, preferably a polymethylene substituent benzene sulfonic acid, said polymethylene substituent having from 18–40, optimally 24 to 32 carbons, in an amount of from about 0.01 wt. % to 8 wt. % at a temperature within the range of about 150° C. to about 200° C. and for a period from about 0.1 hour to about 20 hours, e.g. for 1 hour at 190° C. This further step results in an additive oil composition of improved viscosity stability which has no visually perceptible haze.

Thus, this invention also relates to the novel graft ethylene copolymeric derivatized compositions of the amide-imide type as well as lubricants containing these copolymers prepared as described herein.

DETAILED DESCRIPTION OF THE PRESENT INVENTION

CARBOXYLIC GRAFTING OF ETHYLENE COPOLYMERS

The Ethylene Copolymer

The ethylene copolymers to be grafted in accordance with this haze-clearing invention contain from about 2 to about 98, preferably 30 to 80 wt. % of ethylene, and about 2 to 98, preferably 20 to 70, wt. % of one or more $C_3$ to $C_{28}$, preferably $C_3$ to $C_{18}$, more preferably $C_3$ to $C_8$, alpha-olefins, e.g. propylene. Such copolymers preferably have a degree of crystallinity of less than 25 wt. %, as determined by X-ray and differential scanning calorimetry, and a number average molecular weight ($M_n$) in the range of about 700 to about 500,000, preferably 10,000 to 250,000, as determined by vapor phase osmometry (VPO) or membrane osmometry. Copolymers of ethylene and propylene and most preferred. Other alpha-olefins suitable in place of propylene to form the copolymer or to be used in combination with ethylene and propylene to form a terpolymer include 1-butene, 1-pentene, 1-hexene, 1-octene; also branched chain alphaolefins, such as 5-methylpentene-1 and 6-methylheptene-1 and mixtures thereof.

Terpolymers of ethylene, said alpha-olefin and a nonconjugated diolefin or mixtures of such diolefins may also be used. The amount of the non-conjugated diolefin ranges from about 0.5 to 20 mole percent, preferably about 1 to about 7 mole percent, based on the total amount of ethylene and alpha-olefin present. Representative diolefins include cyclopentadiene, 2-methylene-5-norbornene, nonconjugated hexadiene, or any other alicyclic or aliphatic non-conjugated diolefin having from 6 to 15 carbon atoms per molecule, such as 2-methyl or ethyl norbornadiene, 2,4-dimethyl-2-octadiene, 3-(2-methyl-1-propene) cyclopentene, ethylidene norbornene, etc.

These ethylene copolymers, this term including terpolymers, may be prepared using the well-known Ziegler-Natta catalyst compositions as described in U.K. Pat. No. 1,397,994.

Such polymerization may be effected to produce the ethylene copolymers by passing 0.1 to 15, for example, 5 parts of ethylene; 0.05 to 10, for example, 2.5 parts of said higher alpha-olefin, typically propylene; and from 10 to 10,000 parts of hydrogen per million parts of ethylene; into 100 parts of an inert liquid solvent containing (a) from about 0.0017 to 0.017, for example, 0.0086 parts of a transition metal principal catalyst, for example, $VOCl_3$; and (b) from about 0.0084 to 0.084, for example, 0.042 parts of cocatalyst, e.g. $(C_2H_5)_3Al_2Cl_3$; at a temperature of about 25° C. and a pressure of 60 psig for a period of time sufficient to effect optimum conversion, for example, 15 minutes to one-half hour; all parts being parts by weight.

Ethylenically Unsaturated Carboxylic Acid Materials

These materials which are grafted (attached) onto the copolymer contain at least one ethylenic bond and at least one, preferably two, carboxylic acid or its anhydride groups or a polar group which is convertible into said carboxyl groups by oxidation or hydrolysis. Maleic anhydride or a derivative thereof is preferred as it does not appear to homopolymerize appreciably but grafts onto the ethylene copolymer or terpolymer to give two carboxylic acid functionalities. Such preferred materials have the generic formula

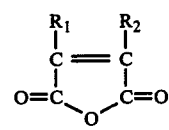

wherein $R_1$ and $R_2$ are hydrogen or a halogen and 0 is oxygen. Suitable examples additionally include chloromaleic anhydride, itaconic anhydride, or the corresponding dicarboxylic acids, such as maleic acid or fumaric acid or their monoesters.

Grafting of the Polymer

The free-radical induced grafting of ethylenically unsaturated carboxylic acid materials in solvents, such as benzene is known in the art (see U.S. Pat. No. 3,236,917). The grafting according to the process of this invention is carried out at an elevated temperature in the range of about 100° C. to 250° C., preferably 120° to 190° C., and more preferably 150° to 180° C., e.g. above 160° C., in a solvent, preferably a mineral lubricating oil solution containing, e.g. 1 to 50, preferably 5 to 30 wt. %, based on the initial total oil solution, of the ethylene polymer and preferably under an inert environment. The grafting is carried out in the presence of a high-temperature decomposable compound capable of supplying free radicals at said elevated temperature.

The free-radical initiators which may be used are peroxides, hydroperoxides, and azo compounds and preferably those which have a boiling point greater than about 100° C. and decompose thermally within the grafting temperature range to provide said free radicals. Representative of these free-radical initiators are azobutyronitrile and 2,5-dimethyl-hex-3-yne-2,5 bis-tertiary-butyl peroxide, commercially sold as Lupersol 130 or its hexane analogue. The initiator is used at a level of between about 0.005% and about 1%, based on the total weight of the polymer solution.

The ethylenically unsaturated carboxylic acid material, e.g. maleic anhydride, is used in an amount ranging from about 0.01% to about 10%, preferably 0.1 to 2.0%, based on the weight of the initial total oil solution. The aforesaid carboxylic acid material and free radical initiator are used in a weight percent ratio range of 1.0:1 to 30:1, preferably 2.0:1 to 7:1, more preferably 3.0:1 to 6:1.

The grafting is preferably carried out in an inert atmosphere, such as by nitrogen blanketing. While the grafting can be carried out in the presence of air, the yield of the desired graft polymer is decreased as compared to grafting under an inert atmosphere. The inert environment should be substantially free of oxygen. The grafting time ranges from about 0.1 to 12 hours, preferably from about 0.5 to 6 hours, more preferably 0.5 to 3 hours. The graft reaction is carried out to at least approximately 4 times, preferably at least about 6 times the half-life of the free-radical initiator at the reaction temperature employed, e.g. with 2,5-dimethyl hex-3-yne-2,5-bis(t-butyl peroxide) 2 hours at 160° C. and one hour at 170° C.

In the grafting process, the copolymer solution is first heated to grafting temperature and thereafter said carboxylic acid material and initiator are added with agitation although they could have been added prior to heating. When the reaction is complete, the excess acid material is eliminated by an inert gas purge, e.g. nitrogen sparging.

In the grafting step, the maleic anhydride or other carboxylic acid material used is grafted onto both the polymer and the solvent for the reaction. The wt. % grafted onto the polymer is normally greater than the amount grafted onto the oil due to greater reactivity of the polymer to grafting. However, the exact split between the two materials depends upon the polymer and its reactivity, the reactivity and type of oil, and also the concentration of the polymer in the oil. The split can be measured empirically from the infra red analyses of product dialyzed into oil and polymer fractions and measuring the anhydride peak absorbance in each.

The grafting is preferably carried out in a mineral lubricating oil which need not be removed after the grafting step but can be used as the solvent in the subsequent reaction of the graft polymer with the polyfunctional material and as a solvent for the end product to form the concentrate.

Polyamines

Useful polyamines for reaction with the grafted ethylene-containing polymers are those which have at least two primary amino groups (hereafter designated poly(primary amines), i.e. one group to react with the dicarboxylic acid moiety to form the imido linkage and one more group to react with the organic acid anhydride whereby an amide is formed. Such poly(primary amines) can be represented by the formula

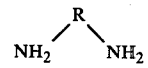

wherein R represents an alkylene group, an alkylene imino group, a hydrocarbyl group, a saturated ring structure, an unsaturated ring structure or a nitrogen containing heterocyclic ring structure. The useful poly(primary amines) include poly(primary amines) of about 2 to 60, e.g. 3 to 20, total carbon atoms and about 2 to 12, e.g. 2 to 6 nitrogen atoms in the molecule, which amines may be hydrocarbyl poly(primary amines) or may be hydrocarbyl poly(primary amines) including other groups, e.g., cyano groups, amide groups, imidazoline groups, and the like. Preferred amines are aliphatic saturated poly(primary amines), including those of the general formula:

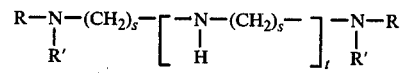

wherein R and R' are independently selected from the group consisting of hydrogen, amino alkylene radicals, and $C_1$ to $C_{12}$ alkylamino $C_2$ to $C_6$ alkylene radicals, s is a number of from 2 to 6, preferably 2 to 4, and t is a number of from 0 to 10, preferably 2 to 6.

Examples of suitable amine compounds include ethylene diamine, diaminomethane, 1,3-diaminopropane, 1,4-diaminobutane, 1,6-diaminohexane, diethylene triamine, triethylenetetraamine, tetraethylene pentamine, 1,2-propylene diamine, di-(1,2-propylene) triamine, di-(1,3-propylene) triamine, di-(1,4-butylene) triamine and N,N-di-(2-aminoethyl)ethylene diamine.

Other useful amine compounds include alicyclic diamines such as 1,4-di-(aminomethyl) cyclohexane and heterocyclic nitrogen compounds such as N-aminoalkyl piperazines of the general formula:

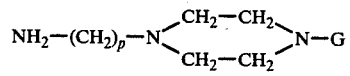

wherein G is an omega-aminoalkylene radical of from 1 to 3 carbon atoms and p is an integer of from 1 to 4. An example of such an amine is N,N'-di-(2-aminomethyl) piperazine.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene groups, forming such compounds as diethylene triamine, triethylenetetramine, tetraethylene pentamine and isomeric piperazines. Low cost poly(ethylene amines) compounds having a composition approximating tetraethylene pentamine are available commercially under the trade name Polyamine 400. Still other polyamines separated by hetero atom chains such as polyethers or sulfides can be used.

Multifunctionalization (Imidization) Process

The grafted polymer, preferably in solution, can be readily reacted with said poly(primary amine) and mixtures thereof by admixture together and heating at a temperature of from about 100° C. to 250° C. for from 10 minutes to 30 hours, preferably 10 minutes to 10 hours, usually about 15 minutes to about 3 hours. It is preferred to use 0.01 to 2.5 mole, more preferably 0.5 to 1.0 mole, of the poly(primary amine) per mole of grafted carboxylic material such as maleic anhydride. The reaction of diethylene triamine with the grafted ethylene-containing polymer occurs in 15 minutes or less at 170° C. with a nitrogen blanket.

The solution grafting step when carried out in the presence of a high temperature decomposable peroxide is accomplished without significant degradation of the chain length (molecular weight) of the ethylene-containing polymer. Measurement of molecular weights and degradation can be evaluated by determination of the thickening efficiency of the polymer.

Thickening efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to $(M_n)$ and is a convenient, useful measurement for formulation of lubricating oils of various grades.

The oil having attached, grafted carboxyl, e.g. maleic anhydride, groups when reacted with the polyfunctional derivatives, e.g. polyamine, is also converted to the corresponding derivatives.

The imidization reaction product contains in the range of 0.001 to 8, preferably 0.01 to 2, wt. % nitrogen and/or oxygen and has a $M_n$ in the range of 700 to 500,000, preferably 700 to 250,000.

AMIDE REACTION

The imidization reaction product is readily reacted with the organic acid anhydride to achieve amidation of the imidized grafted ethylene copolymer.

Suitable organic acid anhydrides include both: the anhydride of a monocarboxylic acid represented by the structure $$R-\overset{O}{\underset{\|}{C}}-O-\overset{O}{\underset{\|}{C}}-R$$

wherein R is selected from an alkyl, substituted alkyl, cycloalkyl, substituted cycloalkyl, alkenyl, substituted alkenyl, aryl, substituted aryl or heterocyclic radical and a substituted heterocyclic radical and can contain from one to 30 carbon atoms; and, the anhydride of a dicarboxylic acid represented by the structure

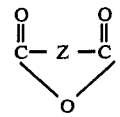

wherein Z is selected from alkylene, arylene and alkenylene and contains from 2 to 10 carbon atoms.

For the anhydrides of the monocarboxylic acids, the anhydrides of the following acids are representative.

(a) Aliphatic monocarboxylic acids (i) Where R is an alkyl or substituted alkyl radical, i.e. acetic acid, fluoroacetic acid, propionic acid, beta-chloropropionic acid, butyric acid, isobutyric acid, nitroisobutyric acid, valeric acid, isovaleric acid, hexanoic acid, heptanoic acid, 2-ethylhexanoic acid, nonanoic acid, decanoic acid, dodecanoic acid, undecanoic acid, tetradecanoic acid, hexadecanoic acid, heptadecanoic acid, octadecanoic acid, eicosanoic acid, docosanic acid and triacontanoic acid.

(ii) Where R is an alkenyl or substituted alkenyl radical, i.e. butenic acid, pentenic acid, hexenic acid, teracrylic acid, hypogeic acid, oleic acid, elaidic acid, linoleic acid, alpha-eleostearic acid, beta-eleostearic acid, alpha-linolenic acid, acrylic acid, beta-chloroacrylic acid, methacrylic acid, crotonic acid, isocrotonic acid, 3-butenoic acid, angelic acid, senecioic acid, hydrosorbic acid, sorbic acid and 4-tetradecenoic acid.

(b) Alicyclic monocarboxylic acids

Cyclopropanecarboxylic acid, cyclopentane-carboxylic acid, cyclohexanoic acid, hydrocapric acid, chaulmoogric acid, naphthenic acid, 2,3,4,5-tetrahydrobenzoic acid and cyclodecanecarboxylic acid.

(c) Aromatic monocarboxylic acids

Benzoic acid, 1-naphthoic acid, 2-naphthoic acid, o-toluic acid, m-toluic acid, p-toluic acid, o-chlorobenzoic acid, m-chlorobenzoic acid, p-chlorobenzoic acid, 2,3-di-bromobenzoic acid, 3,4-dichlorobenzoic acid, o-nitrobenzoic acid, m-nitrobenzoic acid, p-nitrobenzoic acid, 2,3-dinitrobenzoic acid, salicyclic acid, m-hydroxybenzoic acid, p-hydrobenzoic acid, gallic acid, anisic acid, phenylacetic acid and beta-phenylpropionic acid.

(d) Heterocyclic monocarboxylic acids

Picolinic acid, nicotinic acid, furylacrylic acid, piperic acid, indoxylic acid, 3-indoleacetic acid, cinchoninic acid, furoic acid, 2-thiophenecarboxylic acid, 2-pyrrolecarboxylic acid, 9-acridancarboxylic acid, quinaldic acid, pyrazionic acid and antipyric acid.

For the anhydrides of the dicarboxylic acids the anhydrides of the following acids are representative.

(a) Aliphatic dicarboxylic acids (i) Where Z is an alkylene radical, e.g. succinic acid and glutaric acid.

(ii) Where Z is an alkenylene radical, i.e. maleic acid, fumaric acid, glutaconic acid, citraconic acid and itaconic acid.

(b) Aromatic dicarboxylic acids, e.g. phthalic acid.

The amidation of the imide grafted ethylene copolymer which imidization reaction was preferentially carried out in a mineral oil solution can be preferentially conducted as a conducted as a continuation of the imidization reaction by subsequently injecting the organic acid anhydride directly into the system. If desired, amidation can be a separate non-integrated reaction step. A sufficient amount of the organic acid anhydride is introduced into the heated solution containing the imidized grafted ethylene copolymer and the reaction carried on for a period of 0.25 to 8 hours at a temperature ranging from 50 to 250° C., a temperature of about 100° to 200° C. being preferred. In order to fully complete the reaction, it is useful to utilize a slight excess, i.e. 1 to 30, more usually about 1 to 10, percent by weight of the injected anhydride. The entire reaction is carried out under an inert atmosphere, for example, a nitrogen blanket and the referenced organic acid byproduct removed from the system by sparging or other means in order to complete the reaction. With a low boiling acid, e.g. acetic acid, this is accomplished by nitrogen sparging.

The amidation process step is preferentially conducted on an imidized graft ethylene copolymeric mineral oil solution wherein the excess poly(primary amine) e.g. alkylene polyamine is reduced to a level of less than about 0.05, optimally less than about 0.02, weight percent free (unreacted) amine.

The amidation reaction can be monitored by differential infrared analysis of the reaction medium. Differential infrared analysis involves absorption comparison of a sample of the starting material placed in the reference beam with a test sample placed in the sample beam using matched cells. It has been found that amidation results in the development of maximum absorption at an amide band of 1650–1670 cm$^{-1}$ whereas the acid absorption band of between 1720 and 1740 cm$^{-1}$ first increases and then decreases as the reaction is completed since the excess anhydride and acid byproducts responsible for acid absorption are depleted through removal. The best method of monitoring completion of the amidation of the imide grafted ethylene copolymer is to continue the reaction until absorption at the 1650–1670 cm$^{-1}$ band is at a maximum.

Illustrative of such differential I.R. monitoring of the reaction is the following Table I which shows the varying levels of absorption for the amide and acid bands during amidation with acetic acid anhydride.

Table I

| Reaction Time (Min.) | Absorbance | |
|---|---|---|
| | Amide Peak 1650 cm$^{-1}$ | Acid Peak 1720 cm$^{-1}$ |
| 0 | 0 | 0 |
| 15 | .078 | .10 |
| 30 | .143 | .162 |
| 60 | .189 | .170 |
| 120* | .181 | .237 |
| 180 | .176 | 0 |
| 240 | .164 | 0 |

*reaction at ~120° C. believed completed and sparging with nitrogen initiated.

Haze-Treating Step

The mineral oil additive composition containing the ethylene copolymer dispersant additives usually contain from about 0.1 to about 50 wt. % based upon the total weight of the hydrocarbon solution of the amidated-imidated, grafted ethylene copolymer additive. In some instances, these oil additive compositions are found to be hazy because they contain a hazing material derived from homopolymerization of the grafted moieties and/or low molecular weight polar species insoluble in oil. It is therefore useful to treat the composition according to the process of U.S. patent application Ser. No. 792,199 filed Apr. 29, 1977 (of common assignee with this application), i.e., by adding at least a haze removing amount of an oil-soluble acid having a pK of less than about 2.5, e.g. a dialkylbenzene sulfonic.

It has been found useful to carry out the haze removing process by treating said copolymer containing oil composition with said organic acid in an amount within the range of from about 0.1 to about 2.5 molar equivalents of oil-soluble organic acid per molar equivalent of haze material. Preferably said acid is added in an amount of 1 equivalent per equivalent of haze. A molar equivalent of haze material is measured by reference to the total molar amount of polyfunctional material which reacts with said grafted copolymer, e.g. one mole of said material equals one molar equivalent of haze material.

The treatment of the haze containing oil composition is carried out at a temperature of about room temperature to about 250° C., preferably from about 150° to about 200° C. and for a time period of about 0.1 hour up to about 20 hours, preferably from 0.5 to about 3 hours. The oil-soluble acid preferably has a pK of from about 0.001 to about 2.5, optimally from about 0.1 to about 2. The term pK for the purpose of this disclosure is used herein to express the extent of the dissociation of the acid used to treat the haze causing substance. Thus, pK can be defined as the negative logarithm to the base 10 of the equilibrium constant for the dissociation of the oil-soluble strong acid.

Useful acids which eliminate the hazing property of the hazing substance are represented by oil-soluble derivatives of alkyl carboxylic acids such as isostearic acid, maleic acid, malonic acid, phosphoric acid, thiophosphoric acids, phosphonic acid, thiophosphonic acids, phosphinic acid, thiophosphinic acids, sulfonic acid, sulfuric acid, sulfinic acid and alpha-substituted halo- or nitro- or nitrilo-carboxylic acids wherein the oil solubilizing group or groups are hydrocarbyl and containing from about 3 to about 70, preferably from about 18 to 40, optimally 25 to 32 carbon atoms.

Particularly preferred for use in this invention for treating the hazing substance are the oil-soluble sulfonic acids which are typically alkaryl sulfonic acids. These alkylaryl sulfonic acids generally have from 9 to 76, preferably 24 to 46, total carbons. The alkyl substituent or substituents preferably have 18 to 40, optimally 24 to 32, total carbons.

Especially preferred alkyl mono-aryl sulfonic acids are those acids that are formed by alkylating benzene with oligomers of propylene or $C_4$–$C_{10}$ 1-alkenes containing 20 to 40 carbon atoms and thereafter sulfonating the resulting alkylate. The class of compounds may thus be identified as the polyalkyl benzene sulfonic acids. An especially preferred compound is the octacosyl benzene sulfonic acid wherein the alkyl radical is derived from a nominal 28 carbon propylene oligomer.

A wide range, e.g. 0.001 to 50 wt. %, preferably 0.005 to 20%, of the oil-soluble nitrogen and/or oxygen containing graft polymers treated in accordance with this invention can be incorporated into about a major amount of an oleaginous material, such as a lubricating oil or hydrocarbon fuel. When used in lubricating oil compositions, e.g., automotive or diesel crankcase lubricating oil, the treated polymer concentrations are within the range of about 0.01 to 20 wt. %, e.g., 0.1 to 15.0 wt. %, preferably 0.25 to 10.0 wt. %, of the total composition. The lubricating oils to which the products of this invention can be added include not only hydrocarbon oil derived from petroleum, but also include synthetic lubricating oils such as esters of dibasic acids and complex esters made by esterification of monobasic acids, polyglycols, dibasic acids and alcohols.

The amidated-imidated graft of the invention may be commercialized and/or utilized in a concentrate form, e.g., from about 10 wt. % to about 50 wt. %, preferably 15 to 49 wt. %, in oil, e.g., mineral lubricating oil, for ease of handling.

The above concentrates and lubricating oil compositions may contain other conventional additives, such as dyes, pour point depressants, antiwear agents, antioxidants, other viscosity-index improvers, dispersants and the like.

The following examples illustrate more clearly the process of the present invention. However, these illustrations are not to be interpreted as specific limitations of this invention.

DESCRIPTION OF THE PREFERRED EMBODIMENTS

Practice of this invention may be illustrated by the following examples which show how the invention may be utilized. In these examples, as elsewhere in this specification, all parts are by weight unless specifically indicated otherwise all nitrogen were determined by Kjeldahl analysis.

EXAMPLE 1

PREPARATION OF IMIDE GRAFT ETHYLENE COPOLYMER 5314 kilograms of a 20.2 wt. % solution of an ethylene-propylene copolymer concentrate (made by the Zeigler-Natta process using $H_2$ moderated $VOCl_3$/aluminum sesquichloride catalyst having a crystallinity less than 25%; containing about 45 wt. % ethylene and 55 wt. % propylene; and having a T.E. of 1.4 ($\overline{M}_n$ = 27,000) in S130N (Solvent 130 Neutral Mineral Oil) was heated to 250° F. under $N_2$ sparge and stirring, taking 1 hour and 5 min. Under $N_2$ blanket 31 kilograms of maleic anhydride were added over 10 minutes. The solution was heated to 310° F., taking 2 hours and 15 min. Lupersol 130, 6 kilograms, (2,5-dimethyl hex-3-yne-2,5-bis-tertiary butyl peroxide) was added in three equal charges over a 2 hour and 50 min. period. Excess maleic anhydride was stripped out with $N_2$ over 2 hours and 20 minutes. 20 kg of diethylene triamine (DETA) was charged and allowed to react for 1.5 hrs. Excess DETA was stripped with vacuum and $N_2$ for 6 hours. The resulting material was diluted with S130N to 14 wt. % polymer, cooled and drummed. The final material had about 0.262 wt. % DETA incorporated.

EXAMPLE 2

PREPARATION OF ACYLAMIDATE OF MALEIMIDE GRAFT OF ETHYLENE COPOLYMER 2528 grams (0.065 moles of DETA) of the product of Example 1 was heated to 120° C. under a nitrogen sparge. To this heated solution, 16.9 grams (0.669 wt. %, 0.166 moles, an excess) of acetic anhydride was slowly added over a period of 30 minutes with stirring. The mixture is allowed to soak at a temperature of about 120° C. under the nitrogen blanket for 1.5 hours after which the reaction byproducts including the acetic anhydride were sparged off for two hours at a temperature of 120° C. with nitrogen. The resulting product shows under differential I.R. a substantial absorption peak at 1650 $cm^{-1}$ and a lack of acetic acid, since there is substantially no absorption at 1720 $cm^{-1}$. The resulting copolymer solution had a color of 5 with a haze reading of 108, nephelos unchanged from the starting material, as measured on a nephelometer purchased from Kohlmann Industries, Maywood, ILL and identified as Model 9. This material had a viscosity of 1543 centistokes at 210° F., active ingredient of 15.42 wt. % by dialysis, N wt. % of 0.12% (0.49 wt. % N on polymer), flash point of 420° F. and T.E. of 1.43. On blends with a test oil of 6.2 cs, 9.5 wt. % gave a 12.8 cs. 210° F. viscosity, 13% sonic shear breakdown, a pour point (with 0.4 wt. % of a vinyl acetate fumarate pour depressant) of less than −35° C., and a 0° F. viscosity of 25.3 poise in a Cold Cranking Simulator (ASTM method).

EXAMPLE 3

150 pounds of 20% by weight of 1.4 T.E. ethylene-propylene rubber in S130N were added to a 50 gallon kettle. Under $N_2$ blanket this was heated to 121° C. It was sparged for 1 hour. 0.909 pounds of maleic anhydride were added and the solution heated to 154° C. under $N_2$ blanket. 0.1905 lbs. of Lupersol 130 was added over 1½ hours in 3 equal amounts. The reaction continued 30 min. The mixture was then $N_2$ stripped to eliminate free maleic anhydride for 1½ hours. 0.6 lbs. of DETA were added and reacted for 1 hour. The solution was stripped for 1 hour with $N_2$ and 84 kilopascals of vacuum. 0.75 lbs. of acetic anhydride were charged, reacted for 1 hour and the mixture stripped for 3 hours with $N_2$ and vacuum. The material was then diluted to 14 wt. % with S130N. The final product had the following characteristics:

| | |
|---|---|
| 99° C. Visc. | 1032 cs. |
| T.E. | 1.49 |
| Haze, nephelos | 99 |
| Color, ASTM | 5 |
| N wt.%, concentrate | .125 |
| N wt.%, polymer | .39 |
| 6 week at 82° C. Storage Stability increase in 99° C. Visc. in %/Hr. | .004 |

EXAMPLE 4

300 grams of Example 1 product was charged into a 4-necked 1 liter flask and heated to 125° C. while stirring and $N_2$ blanketing. 1 gram of acetic anhydride was added and reacted for 1 hour. The mixture was stripped for 1 hour at 125° C. The temperature was then raised to 170° C. and 3 grams of $C_{24}$ ave. alkylbenzene sulfonic acid were added. Reaction continued for 4 hours. The haze was reduced from 108 (initial) to 16 nephelos.

EXAMPLE 5

ACETIC ACID SALT OF MALEIMIDE OF GRAFT ETHYLENE COPOLYMER 3000 grams (0.077 moles of DETA) of the product of Example 1 were charged to a flask and heated to 118° C. with $N_2$ sparge. 10 grams (0.167 moles, an excess) of glacial acetic acid were injected. The resulting admixture was reacted at 118° C. with stirring and under a nitrogen blanket and maintained at 118° C. for about 1 hour. The solution was then heated to 155° C. and maintained there for 2 hours with nitrogen blanket. The mixture was then sparged at 155° C. for two hours. The differential IR showed presence of acetic acid during reaction, which was almost completely lost after sparging. Storage stability tests showed no improvement in stability over the starting material. We conclude there is no significant amidation occurring when the acid itself is used rather than the anhydride and literature information indicate that excessive heat and pressure (if the acid is volatile) is necessary to convert the acid salt to the amide. Patents covering the use of acids themselves with amines are not relevant to the present invention.

EXAMPLE 6

Acid anhydrides are well known not to react with tertiary amines. However, they may react with secondary amines. From the stoichiometry of the reaction of acetic anhydride with an imide made from DETA, as derived from their amide measurements, only the primary amine, *not* the secondary amine, reacts in this case.

EXAMPLE 7

The utility of the inventive additives were measured by subjecting the products of Examples 1 and 2 to a standard engine test of blended formulations containing these additives. A 15W50 SAE crankcase oil formulation was made up using 12.5 wt. % of the oil concentrate of Example 2, 2 volume % of an ashless dispersant additive, 1.1 volume % of an overbased magnesium sulfonate, 0.8 volume % of overbased calcium phenate, 0.5 volume % of an antioxidant, and 1.43 volume % of a zinc dialkyldithiophosphate and a mineral lubricating oil blend of base stocks. For comparison purposes, a formulation was made up in the same manner replacing the oil concentrate of Example 2 with the same weight percent of the oil concentrate of Example 1. The above formulations were tested in the Sequence V-C Engine Test, which is described in "Multicylinder Test Sequences for Evaluating Automotive Engine Oils," ASTM Special Technical Publication 315F, page 133ff (1973). The V-C test evaluates the ability of an oil to keep sludge in suspension and prevent the deposition of varnish deposits on pistons, valves, and other engine parts. The test results given below show that the two blends are not statistically different in performance.

TABLE II

| | MS-VC Test Results | | |
|---|---|---|---|
| | Sludge | Piston Skirt Varnish | Total Varnish |
| Oil with product of Ex. 2 | 9.28 | 7.86 | 8.27 |
| Oil with product of Ex. 1 | 9.31 | 7.98 | 7.99 |
| Passing Criteria for test | 8.5 | 7.9 | 8.0 |

In the above tests, the ratings are on a scale of 0 to 10, with 0 being an excessive amount of sludge and varnish while 10 being a completely clean engine.

EXAMPLE 8

In order to show the surprising viscosity stability provided to the maleimide amide graft products of ethylene copolymeric V.I. improvers provided according to the teachings of this invention, the resulting products Examples 1, 2 and 5 were subjected to a test whereby the change in viscosity of the products were measured over a period of two hours while maintaining the solutions at 99° C. The results are as follows in Table III.

TABLE III

| Test # | Product of Example | Initial Viscosity at 99° C. | Viscosity After 2 Hrs. At 99° C. | Visc. Increase %/Hr. |
|---|---|---|---|---|
| 1 | 2 | 1543 cs. | 1547 | 0.13 |
| 2 | 1 | 1224 | 1251 | 1.10 |
| 3 | 5 | 1273 | 1368 | 1.07 |

The above results show that there is a surprising enhancement of the viscosity stabilization activity of solutions of polymer in oil when the products of the invention are used. This two-hour test has been found to correlate with the long-term storage stability results when the solutions containing polymer are stored at temperatures of about 180° F. for periods of up to two months.

The invention in its broader aspect is not limited to the specific details shown and described and departures may be made from such details without departing from the principles of the invention and without sacrificing its chief advantages.

What is claimed is:

1. A lubricating oil composition comprising a major amount of a lubricating oil having dissolved therein at least a viscosity index improving amount of an oil-soluble ethylene polymeric viscosity index improver having dispersancy properties and containing in the range of from about 0.001 to 8 wt. % of nitrogen, which improver has been formed by: grafting an ethylene copolymer comprising about 30 to 80 wt. % ethylene and about 20 to 70 wt. % $C_3$ to $C_{28}$ alpha olefin, with an ethylenically unsaturated acid material selected from the group consisting of unsaturated carboxylic acids and anhydrides of carboxylic acid, reacting said grafted ethylene copolymer with polyamine of 2 to 60 carbons and 2 to 12 nitrogens and having at least two primary amine groups, wherein essentially one of said primary amine groups reacts with an acid moiety of said grafted ethylene copolymer, and reacting with an anhydride of an acid having a $C_1$ to $C_{30}$ hydrocarbyl group to thereby stabilize the resulting ethylene polymeric viscosity index improver and inhibit viscosity increase of said oil composition upon aging.

2. A composition according to claim 1 wherein said improver is present in an amount of from about 0.1 to 50 wt. %, based upon the total weight of said composition, and is an ethylene-propylene copolymer having a number average molecular weight from about 700 to 500,000 which is grafted with maleic anhydride, reacted with said polyamine, and then reacted with acetic anhydride.

3. A composition according to claim 1 wherein said viscosity index improver is prepared by solution grafting an ethylenically-unsaturated dicarboxylic acid material onto a copolymer comprised of ethylene and at least one $C_3$–$C_{18}$ alpha-olefin at a temperature of from about 100° C. to about 250° C., in the presence of a high-temperature decomposable free-radical initiator having a boiling point in excess of about 100° C., which grafted polymer is then derivatized by reaction with an alkylene polyamine having from 3 to 20 total carbons and about 2 to 6 nitrogen atoms to provide a product having sludge dispersant activity and thereafter reacted with from about 0.5 to 2.5 moles of said anhydride per primary amino group in said product.

4. A composition according to claim 3 wherein said copolymer is of ethylene and propylene having from about 38 to 70 wt. % of ethylene and is present in said composition in an amount ranging from about 0.1 to about 15 wt. %, said dicarboxylic acid material is maleic acid anhydride, said solution grafting is carried out under an inert environment using a mineral lubricating oil as solvent, said polyamine is diethylene triamine and said 0.5 to 2.5 moles of anhydride is of acetic anhydride.

5. A composition according to claim 3 wherein the resulting solution from said reaction with said 0.5 to 2.5 moles of anhydride is treated with an oil-soluble alkyl aryl sulfonic acid containing from about 9 to 76 carbons to inhibit haze.

6. A composition according to claim 5 wherein said sulfonic acid is $C_{24}$ (ave.) alkylbenzene sulfonic acid.

7. A process for improving the viscosity stability of an oil additive concentrate consisting essentially of a hydrocarbon solvent and from 0.1 to 50 wt. %, based on the total weight of said concentrate, of an imidated grafted ethylene/$C_3$-$C_{28}$ α-olefin copolymeric viscosity index improver having a molecular weight $(\overline{M}_n)$ of 700 to 500,000 and a $\overline{M}_w/\overline{M}_n$ ratio of less than 7, said viscosity index improver having dispersancy properties and being formed by grafting maleic anhydride onto an ethylene copolymer comprising about 30 to 80 wt. % ethylene and about 20 to 70 wt. % of said $C_3$-$C_{28}$ α-olefin, followed by reaction of said maleic anhydride moieties with a polyamine of 2 to 60 carbon atoms and 2 to 12 nitrogen atoms and having at least two primary amine groups, wherein at least some of said primary amine groups remain unreacted, said process comprising the step of reacting said concentrate with a hydrocarbyl substituted acid anhydride having from about 2 to 30 carbons by adding said acid anhydride in an amount to provide an excess of at least about 5% based on the primary amino concentration in said concentrate and maintaining said concentrate at a temperature ranging from about 50° to about 250° C. and for a period of 0.25 to 8 hours and thereafter removing all unreacted anhydride and byproducts of said reaction while maintaining said concentrate under an inert and water-free environment.

8. A process according to claim 7 wherein said concentrate contains less than about 0.02 wt. % unreacted alkylene polyamine, said hydrocarbyl substituted acid anhydride is acetic anhydride and said temperature is maintained until maximum absorption at 1650–1670 cm$^{-1}$ is found by differential infrared testing to be at a maximum and said removing is by nitrogen sparging until said absorption is at a minimum at 1650–1670 cm$^{-1}$.

9. A process according to claim 8 wherein there is a further process step of treating said concentrate with an oil-soluble hydrocarbyl substituted strong acid containing a hydrogen dissociating moiety which has a pK of less than about 2.5 and containing about 10 to 70 carbon atoms.

10. A process according to claim 9 wherein said strong acid is a dialkyl substituted benzene sulfonic acid present in an amount ranging from about 0.1 to 2.5 molar equivalents per molar equivalent of nitrogen material introduced onto said graft copolymeric viscosity index improver and said treating is at a temperature ranging from 20° C. to 250° C. for a period ranging from 0.1 to 20 hours.

* * * * *